United States Patent
Korndorffer, Jr. et al.

(10) Patent No.: US 7,802,990 B2
(45) Date of Patent: Sep. 28, 2010

(54) LAPAROSCOPIC CAMERA NAVIGATION TRAINER

(76) Inventors: James R. Korndorffer, Jr., 177 Broadway St., New Orleans, LA (US) 70118; Daniel J. Scott, UT Southwestern Medical Center, Department of Surgery, 5323 Harry Hines Blvd., Dallas, TX (US) 75390-9156

( * ) Notice: Subject to any disclaimer, the term of this patent is extended or adjusted under 35 U.S.C. 154(b) by 1210 days.

(21) Appl. No.: 11/042,803

(22) Filed: Jan. 24, 2005

(65) Prior Publication Data

US 2006/0183095 A1 Aug. 17, 2006

Related U.S. Application Data

(60) Provisional application No. 60/538,588, filed on Jan. 23, 2004.

(51) Int. Cl.
*G09B 23/28* (2006.01)
(52) U.S. Cl. .................................. 434/262; 434/272
(58) Field of Classification Search .................. 434/262
See application file for complete search history.

(56) References Cited

U.S. PATENT DOCUMENTS

| | | | |
|---|---|---|---|
| 4,907,973 A * | 3/1990 | Hon | 434/262 |
| 5,634,904 A * | 6/1997 | Battenfield | 604/116 |
| 6,283,763 B1 * | 9/2001 | Matsuzaki et al. | 434/262 |
| 6,857,878 B1 | 2/2005 | Chosack et al. | |
| 6,863,536 B1 | 3/2005 | Fisher et al. | |
| 6,929,481 B1 | 8/2005 | Alexander et al. | |
| 6,939,138 B2 | 9/2005 | Chosack et al. | |
| 7,023,423 B2 | 4/2006 | Rosenberg | |
| 7,261,565 B2 | 8/2007 | Chosack et al. | |
| 7,505,030 B2 | 3/2009 | Cunningham et al. | |
| 2004/0142314 A1 * | 7/2004 | Hasson et al. | 434/262 |
| 2005/0064378 A1 * | 3/2005 | Toly | 434/262 |

OTHER PUBLICATIONS

Gallagher, et al., An Ergonomic Analysis of the "Fulcrum Effect" in Endoscopic Skill Acquisition of Endoscopic Skills, J. Endoscopy, 1998, 30:617-620.

Haluck et al., Reliability and Validity of EndoTower, a Virtual Reality Trainer for Angled Endoscopic Navigation, Stud Health Technol. Inform., 2002, 85:179-184.

(Continued)

*Primary Examiner*—Cameron Saadat
(74) *Attorney, Agent, or Firm*—Christie, Parker & Hale, LLP

(57) ABSTRACT

A system for training users of laparoscopic cameras includes geometric targets disposed in spaced relation upon a base such that acquiring a laparoscopic view of each geometric target requires a change in the orientation of a laparoscopic camera. Each geometric target has disposed thereon an image of the same geometric shape, and each geometric target has an orientation line disposed thereon. The system accommodates both straight and angled laparoscopes. A method for training a person includes providing a system described above and allowing the person to use the laparoscopic camera to acquire images geometric targets. A preferred method includes the steps of having the user repeatedly acquire geometric targets with a 0 degree laparoscope until the measured time is less than a first time threshold and then having the user repeatedly acquire geometric targets with an angled laparoscope until the measured time is less than a second time threshold.

17 Claims, 4 Drawing Sheets

OTHER PUBLICATIONS

Nguyen et al., Laparoscopic Roux-en-Y Gastric Bypass for Morbid Obesity, J. of the Society of Laparoendoscopic Surgeons, Jul.-Sep. 1999, 3(3):193-196.

Seymour et al., Virtual Reality Training Improves Operating Room Performance: Results of a Randomized, Double-blinded Study, Ann Surg, 2002, 236:458-463.

Cuschieri, Laparoscopic gastric resection, The Surgical Clinics of North America, Aug. 2000, 80(4):1269-1284, viii.

Ferzli et al., Evolving Techniques In Endoscopic Extraperitoneal Herniorrhaphy, Surgical Endoscopy, Aug. 1995, 9(8):928-930.

Glasgow et al., Laparoscopic Splenectomy, World Journal of Surgery, Apr. 1999, 23(4):384-388.

Haluck et al., A Virtual Reality Surgical Trainer for Navigation in Laparoscopic Surgery, Studies in Health Technology and Informatics, 2001, 81:171-176.

Hyltander et al., The Transfer of Basic Skills Learned In a Laparoscopic Simulator to the Operating Room, Surgical Endoscopy, Sep. 2002, 16(9):1324-1328.

Jacobs et al., Determination of the Learning Curve of the AESOP Robot, Surgical Endoscopy, Jan. 1997, 11(1):54-55.

Jones et al., The Influence of Three-Dimensional Video Systems on Laparoscopic Task Performance, Surgical Laparoscopy Endoscopy, 1996, 6:191-197.

Jordan, Virtual Reality Training Leads to Faster Adaptation to the Novel Psycomotor Restrictions Encountered By Laparoscopic Surgeons, Surgical Endoscopy, 2001, 15:1080-1084.

Kondraske et al., Surgeon Workload and Motion Efficiency With Robot and Human Laparoscopic Camera Control, Surgical Endoscopy, Nov. 2002, 16(11):1523-1527.

Merola et al., Comparison of Laparoscopic Colectomy With and Without the Aid of a Robotic Camera Holder, Surgical Laparoscopy, Endoscopy & Percutaneous Tech., Feb. 2002, 12(1):46-51.

Omote et al., Self-guided Robotic Camera Control for Laparoscopic Surgery Compared with Human Camera Control, Amer. J. of Surgery, Apr. 1999, 177(4):321-324.

Richardson et al., Laparoscopic Floppy Nissen Fundoplication, Amer. J. or Surgery, Feb. 1999, 177(2):155-157.

Schweitzer et al., Laparoscopic-assisted Roux-en-Y Gastric Bypass, J. of Laparoendoscopic & Adv. Surgical Tech., Part A, Oct. 1999, 9(5):449-453.

Smith et al., Laparoscopic Adrenalectomy: New Gold Standard, World Journal of Surgery, Apr. 1999, 23(4):389-396. Comment in: World J. Surgery, Dec. 1999, 23(12):1318-1319.

* cited by examiner

LAPAROSCOPIC CAMERA NAVIGATION TRAINER

CROSS-REFERENCE TO RELATED APPLICATIONS

This application claims the benefit and priority of U.S. Provisional Patent Application No. 60/538,588, filed Jan. 23, 2004, and hereby incorporates by reference the disclosure of the provisional application.

COPYRIGHT STATEMENT

Not applicable.

FEDERAL RESEARCH STATEMENT

Not applicable.

INCORPORATION-BY-REFERENCE OF MATERIAL SUBMITTED ON A COMPACT DISC OR MICROFICHE APPENDIX

Not applicable.

BACKGROUND OF THE INVENTION (1) Field of the Invention

The field of the invention relates to training devices useful for the teaching of the manipulation of laparoscopes. These training devices are especially useful for the development of skills that will allow a user to maintain a laparoscope in its proper orientation.

2) Description of the Related Art

Visualization of the surgical field is vital to the success of any operative procedure. In traditional open procedures, surgeons control the visualization of the operative field by their eye movements and by manipulation of lighting and retraction. However, this direct control is lost in the performance of laparoscopic surgery as the visualization becomes dependant on the ability of the assistant to navigate the laparoscope. Therefore, the ability of the assistant is pivotal to the success of the operation. This ability must include not only the utilization of a traditional 0°, straight viewing laparoscope, but also the utilization of an angled laparoscope. As laparoscopic procedures have become more complex and have moved from one-quadrant procedures to multi-quadrant procedures, use of the angled laparoscope has become increasingly more critical. Use of an angled laparoscope is advocated in splenctomy (Glasgow, 1999), Nissen fundoplication (Richardson, 1999), gastrectomy (Cuschieri, 2000), gastric bypass (Nguyen, 1999) (Schweitzer, 1999), adrenalectomy (Smith, 1999) and inguinal hernia repair (Ferzli 1995).

Although skilled laparoscopic camera navigation is critical for the success of a laparoscopic procedure, the first time most assistants hold a laparoscope is in the operating room. This can lead to a poor performance by the camera navigator causing frustration for both the camera navigator and the surgeon. To avoid this some surgeons utilize robotic systems for camera navigation.

Studies regarding the use of these robotic systems have met with mixed results. Some have shown a subjective surgeon preference for robotic camera control (Merola, 2002) (Omote, 1999) as well as some objective improvement in inadvertant movement (Kavoussi, 1995) and camera correction or cleaning (Omote, 1999). However when the robotic control was compared to a single experienced camera operator, no difference in surgeon efficiency was noted. (Kondraske, 2002) In one experimental task, manual control was quicker than robotic control (Jacobs, 1997) and both methods showed similar learning curves.

Therefore it is likely an experienced camera operator would be comparable to or better than a nonhuman operator since the experienced operator would require minimal direction from the surgeon, allow for the manipulation of the angle of the lens and perform the rapid changes needed in an acute event.

Laparoscopic camera navigation is often considered the easiest and least important task in the operating room but it can be difficult to master and includes the same barriers described in laparoscopic instrument manipulation, namely, the fulcrum effect (Gallagher, 1998), fixed access points (Jordan, 2001), a 2-demensional environment (Jones, 1996) and decreased range of motion. Skills unique to camera navigation, which must also be mastered, include centering of the operative field, smooth movements to avoid motion sickness, and tracking of instruments. The difficulty in skill acquisition is enhanced when an angled laparoscope is utilized. The rotation of the lens independent of the camera gives the ability to "look around corners" but to use this additional degree of freedom without change of horizon, steadiness or field of view is not intuitive and may be counter intuitive as moving the light cord up points the lens angle down.

Since camera navigation is perceived to be an easy task, the least experienced person in the operating room is often charged with this duty, which can lead to frustration. This frustration is compounded when the camera operator changes between cases, as is seen both in the academic arena with medical students rotating and in the private sector with different operating room technicians. Because of this inexperience, training usually occurs in the operating room but this has been shown to be inefficient and costly. This intra-operative training also requires surgeons to divide their attention between the operation and the manipulation of the camera.

Laparoscopic skills training outside the operating room has become more common and has been shown to translate to performance in the operating room. Despite this, training of camera navigation is not a laparoscopic skill widely taught outside of the operating room and there is no data, other than little virtual reality data (Hyltander, 2002) (Haluck, 2001), regarding training in laparoscopic camera navigation skills.

Virtual reality platforms have been used to teach camera navigation and have shown transfer of the skill to the operating room (Hyltander, 2002). However, these platforms have limitations including a hardware interface found to be inadequate for camera navigation simulation by 86% of subjects (Haluck, 2001). Additionally, a virtual reality platform would not allow camera navigation to be taught in some settings due to setup costs.

BRIEF SUMMARY OF THE INVENTION

One object of this invention is to provide a system and method for training laparoscopic camera users in navigation skills wherein use of the system or method will lead to more efficient laparoscopic navigation in the operating room. Another object of the invention is to allow for training of laparoscopic camera users in the academic and community settings using equipment commonly found in both of these settings.

To achieve these and other advantages and objects, and in accordance with the purposes of the invention as embodied and broadly described herein, the application describes an embodiment of the system and method of the invention.

The board's design assesses manipulation of the laparoscope in all dimensions as well as all lens angles. The utilization of the board tests steadiness, maintenance of horizon, and appropriate sizing. Although smoothness with tracking is not specifically appraised, to achieve an adequate time, smooth transition from one target to the other is vital. Although having performed a large number of laparoscopic cases does not insure expertise in camera navigation, the two experts chosen had extensive experience in camera navigation as well but these numbers could not be quantified, as personal records of camera navigation were not kept.

The following U.S. Patent documents are incorporated herein by reference: U.S. Pat. No. 5,769,640, issued Jun. 23, 1998, for "Method and system for simulating medical procedures including virtual reality and control method and system for use therein"; and United States Published Patent Application No. 20040009459 A1, published Jan. 15, 2004 for "Simulation system for medical procedures".

SUMMARY OF THE INVENTION

The system and method disclosed herein effectively train novices for laparoscopic camera navigation.

The present invention provides a system and method useful in the teaching and acquisition of skills necessary for effective manipulation of the laparoscopic cameras during laparoscopic surgical procedures. The system comprises one or more targets that can be optically acquired by a trainee using a laparoscopic camera. The design of the targets allows an acquisition of skill necessary to maintain the image in the proper orientation, as well as the optimal surgical view. In the method of the invention, the person to be trained uses a laparoscopic camera to acquire an image of each target on the monitor of the laparoscopic camera. A template affixed to or displayed upon the monitor allows the user to judge proper placement of the laparoscopic camera to obtain an image within selected limits for image distortion, image size, and image orientation. The laparoscopic camera may preferably be used in conjunction with a simulated port; in such a situation, each target is oriented so that a user may acquire an acceptable image (as measured by the template) given the geometry of the laparoscope for which the user is being trained. For training in the use of an angled laparoscope, a target preferably may be placed within a partition that blocks a portion or all of the laparoscopic view of the target from a portion of the space reachable by the laparoscope. The partition may take the form of a truncated a rectangular box in which the target is placed upon the complete interior face of the box and the sides of the box are truncated so as to allow a laparoscopic view of the target from a portion of the space reachable by the laparoscope.

Both the foregoing general description and the following detailed description are exemplary and explanatory only and do not restrict the invention as claimed.

DETAILED DESCRIPTION OF THE INVENTION

Embodiments for the system and method of the invention are usable for training for 0° and angled laparoscope camera navigation' and take advantage of equipment already available in laparoscopic skills lab. Throughout this application, the terms "laparoscope" and "laparoscopic camera" are used to denote a laparoscope device for obtaining video images. The term may be used to refer to a laparoscopic camera system. These devices are common in the art; common commercial models of a laparoscopic camera system include a lens, a digital camera, a processor for converting the digital camera's signals into a signal that may be displayed on a video monitor, and a video monitor. One preferred embodiment included a 27.5 cm×21 cm video monitor as part of the laparoscopic camera. Laparoscope lenses are available in various angles, including 0° 30 degrees, 45 degrees, and so on. In this application, an angled laparoscope is a laparoscope having a lens angle other than zero degrees.

Embodiments of the invention may include commercially available Plexiglas or acrylic box trainers.

In a preferred embodiment, the system of the invention includes two bases, the first base 10 for use with a 0 degree laparoscope and the second base 20 for use with a 30 degree laparoscope. Bases may be created for use with angled laparoscopes having other angles as well.

In the embodiments shown, base 10 includes a plurality of geometric targets 12, with each target comprising a red circle 16 marked or mounted on a white non-glare background. The targets 12 are disposed upon base 10 so that acquiring an acceptable image of each target requires a change in the orientation of the laparoscope from the orientation used to acquire the previous target. In a preferred embodiment, each red circle 16 includes a single black horizontal (parallel to the base) line 14, and each target is numbered for reference. In preferred embodiments of each base 10, the base 10 is configured for use with a particular laparoscopic training box and with a laparoscope inserted through a particular port of the training box; and the targets are arranged so that movement of the laparoscope in all dimensions (including adjustments of the angular orientation of the laparoscope). In some alternative embodiments (not shown), the geometric shapes may be straight-sided polygons such as triangles, squares, or rectangles or may be more complex or irregular shapes, including the shapes of alphabetic letters.

Figure 1:
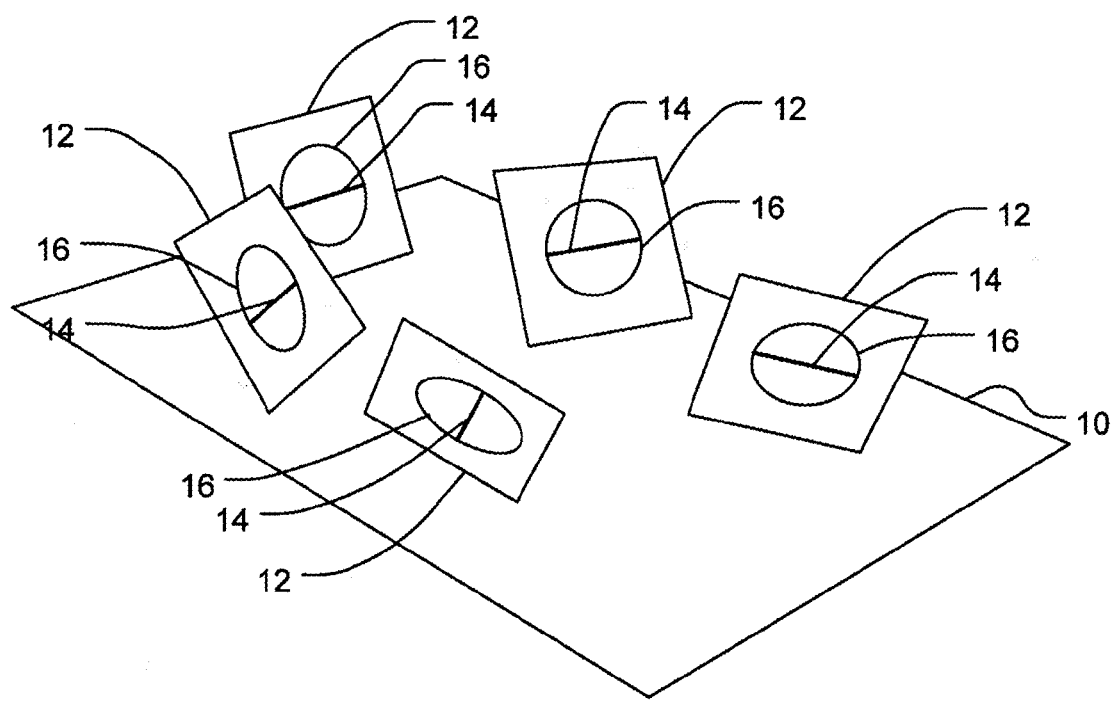
FIG. 1 is a perspective view of a base according to the invention for use with a 0-degree laparoscope.

A preferred embodiment of the 0° base 10 contains five targets 12 with a 5.5 cm. red circle 16 marked or mounted on a 9.3 cm. white square (FIG. 1). The targets 12 are placed in positions to require manipulation of the laparoscope in all dimensions.

Figure 2:
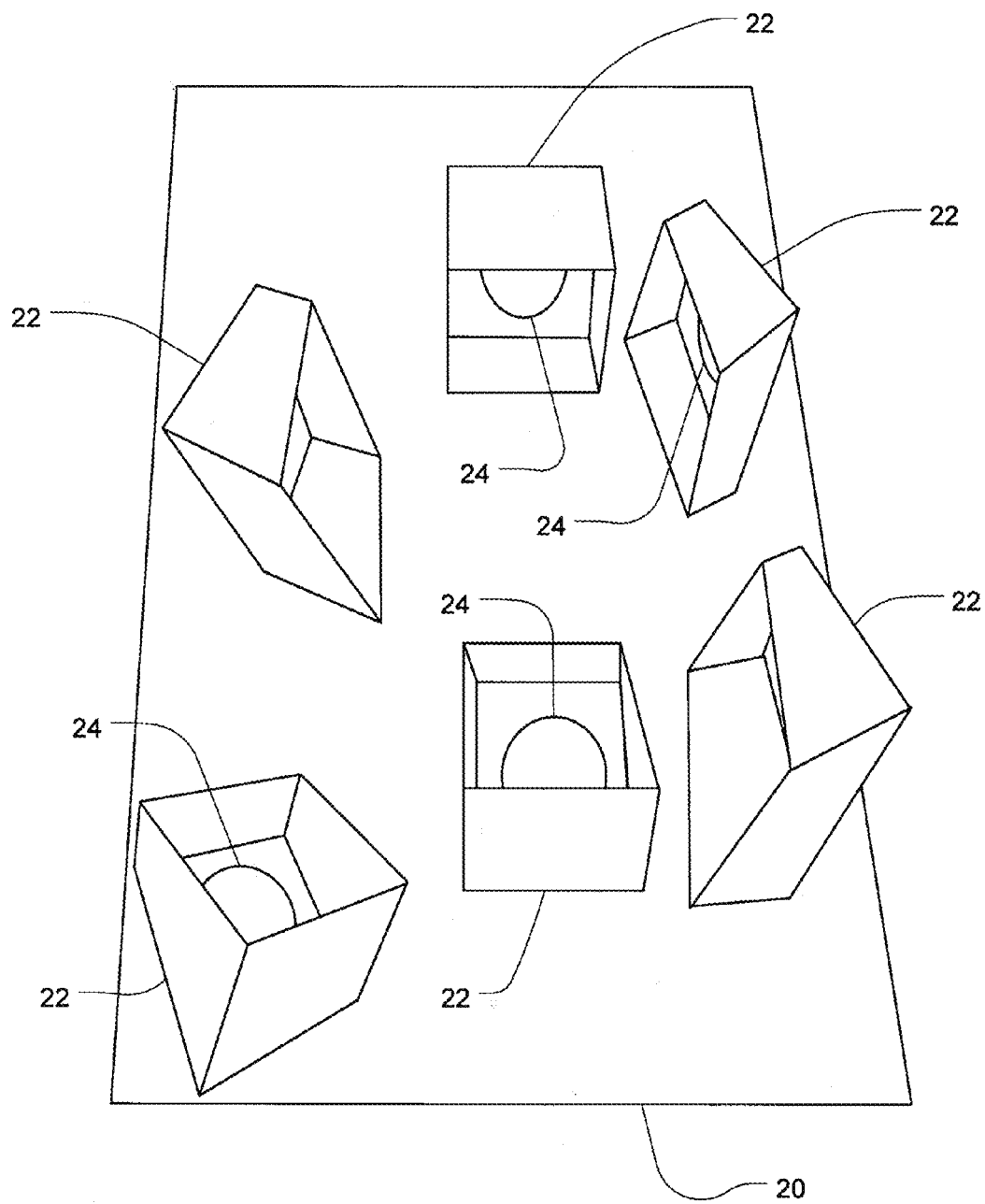
FIG. 2 is a perspective view of a base according to the invention for use with a 30-degree laparoscope.

A preferred embodiment of the 30° base 20 contains six targets 22 with a 4 cm. red circle 26 on a 5 cm. white square (FIG. 2). In this embodiment, each geometric target 22 is disposed within a partition 24 that blocks a portion or all of the laparoscopic view of the target from a portion of the space reachable by the laparoscope. The partition takes the form of an orthogonal box truncated at an angle and in which each target 22 is disposed. The targets 22 are placed in positions to require laparoscope manipulation in all dimensions and at all angles and to permit acquisition of an undistorted image by an angled laparoscope from a location within the space reachable by the laparoscope. To permit acquisition of an undistorted image by a 30 degree laparoscope, the target must be placed such that, when the laparoscope is operating in a space reachable by the laparoscope, the laparoscope lens may be oriented roughly parallel to the surface of the target.

Figure 5:
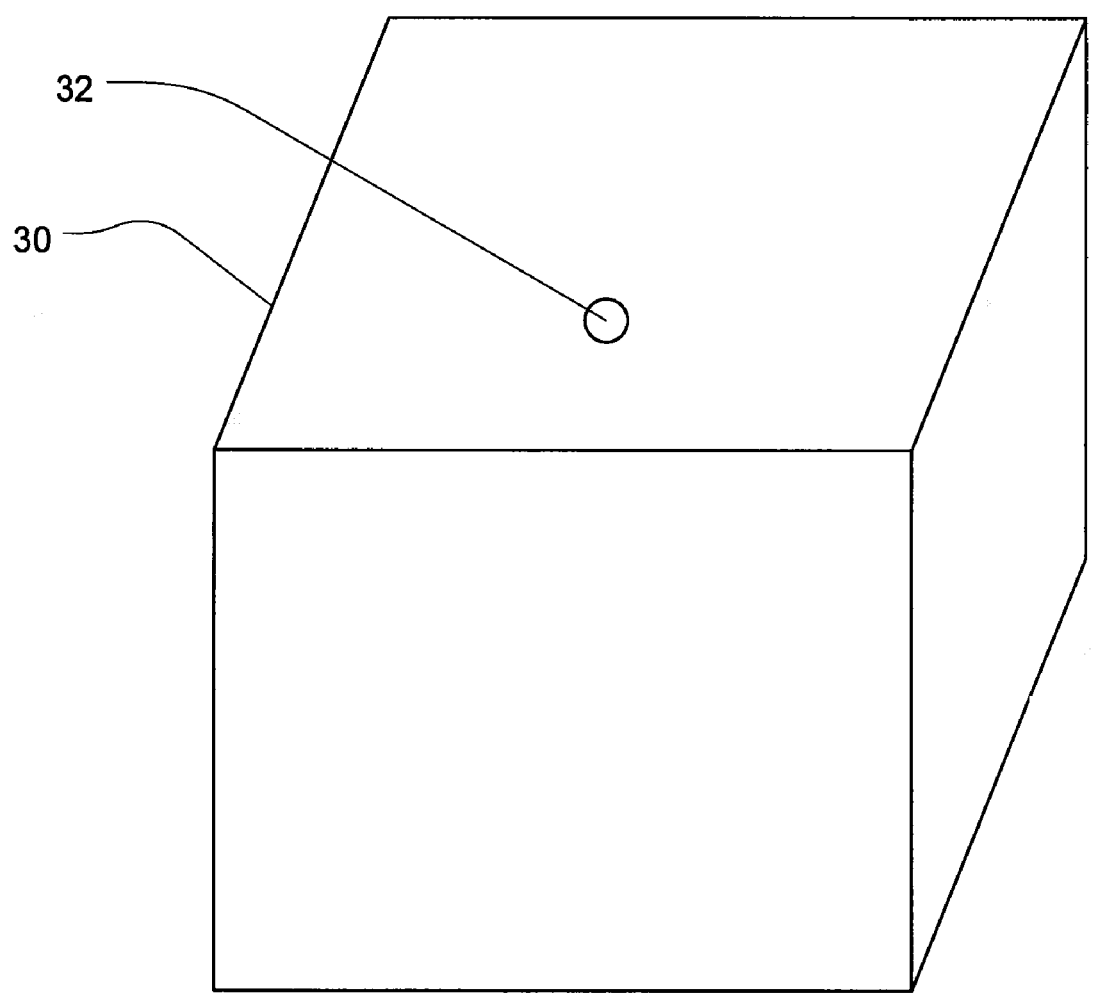
FIG. 5 is a perspective view of a trainer box included in some embodiments of the invention.

In a preferred embodiment, each base 10 and each base 20 is sized to fit inside a particular size box trainer 30 with a simulated port 32 placed at a known location (FIG. 5); the fit of the base to the box trainer leaves little room for movement of the base within the trainer in order to ensure consistent placement. In one embodiment, the base is roughly 45 cm×30 cm sized to fit within an acrylic training box of similar dimensions and was constructed of durable posterboard. Any material of sufficient stiffness to locate the targets (and preferably to withstand handling by users) may be used for the construction of the base-for example, wood, metal, plastic, or cardboard. However, a durable and inexpensive material, such as thick, non-glare posterboard or plastic, is preferred.

Figure 3:
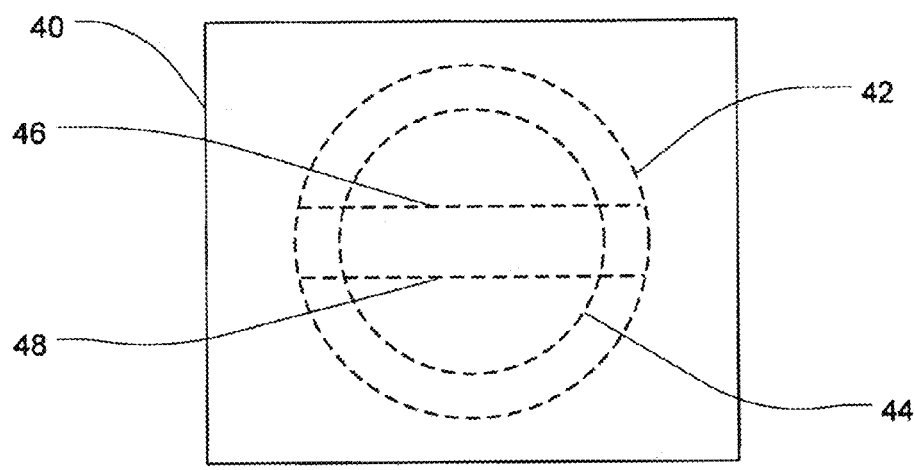
FIG. 3 is a front view of a template according to the invention.
Figure 4:
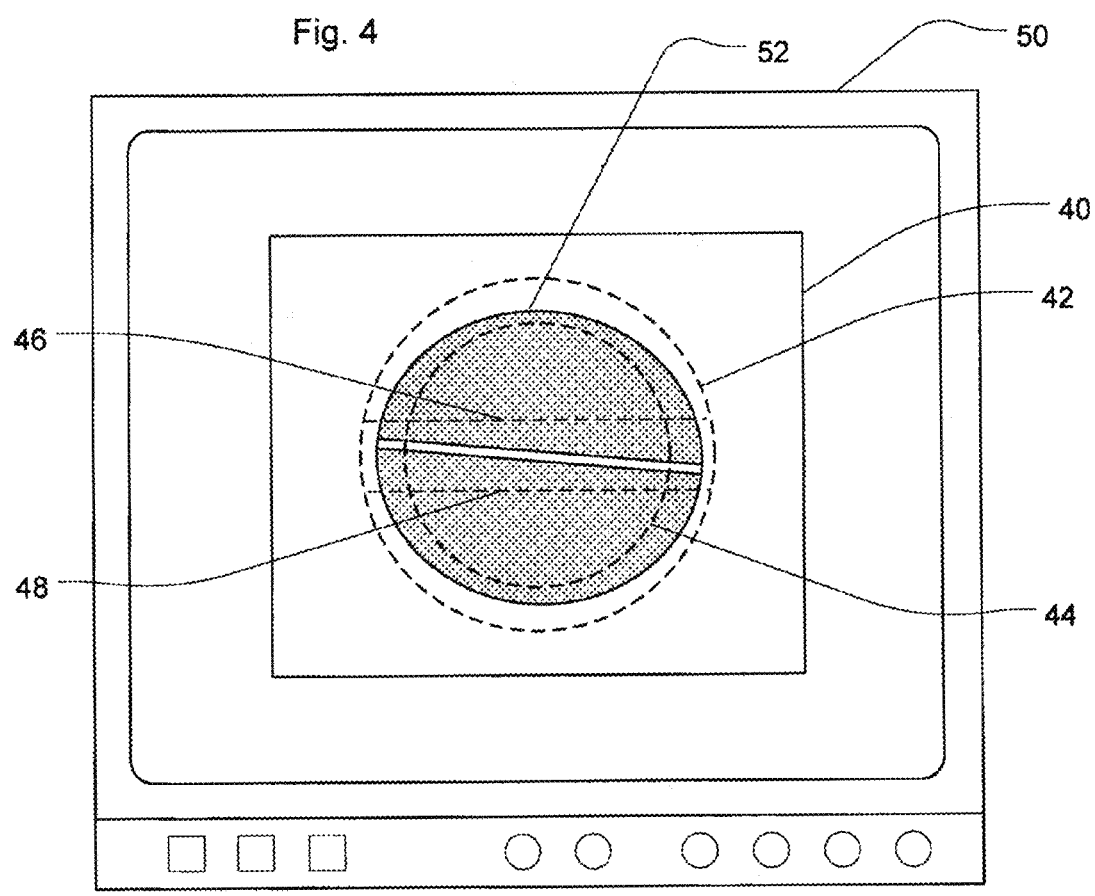
FIG. 4 is a front view of a template according to the invention in a working position upon the monitor of a laparoscopic camera.

A preferred embodiment further includes a target acquisition template 40 to be placed on the laparoscope monitor 50 (FIG. 3). One embodiment of the template 40 was a 20.5 cm.×26.5 cm. transparency imprinted with two concentric circles (10 cm and 12.5 cm diameter) as well as two parallel lines placed 1.25 cm. apart, centered on the common equator of the two circles. The transparency was held in position by the static electricity generated by the monitor 50. The targets were to be acquired within the outer circle 42 but outside of the inner circle 44. The horizontal line on the each target (described above) was to be acquired within the two parallel lines 46 and 48 on the template. FIG. 4 shows an embodiment of template 40 placed on laparoscope monitor 50, which is displaying properly acquired image 52 of target number 5 from a particular base.

Placement of the targets 12 and 22 upon the respective bases 10 and 20 preferably is selected so that movement in all dimensions is required to acquire the targets. Each target must be oriented so that it is possible to orient the face of the laparoscope roughly parallel to the surface of the target. Otherwise, angular displacement of the laparoscope from the correct viewing angle will distort the target shape, making acquisition of an acceptable image impossible. For example, a circular target will be viewed as an oblong shape on the monitor and not fit the circular template.

Preferably, each geometric target 22 of base 20 for use with an angled laparoscope is disposed within a partition 24 that blocks a portion or all of the laparoscopic view of the target 22 from a portion of the space reachable by the laparoscope. Preferably the partition 24 may take the form of an open-faced cubical box having an open end cut at an angle to allow full view of the target.

Preferably the size of the template 40 and the markings appearing thereon are modified until they are of sufficient size to allow for ease of scoring while maintaining a degree of difficulty needed for training. In a preferred embodiment, the total area of the circle on the template 40 was 12% of the total template area. The size difference of the concentric circles allowed a variation in area of 20% decrease and 24% from a perfectly centered 11.25 cm. circle. This correlates to a maximum variation in distance from the target of 2.5 cm. and a maximum horizontal drift of 1.25 cm. The space between the parallel lines 46 and 48 allowed for a maximum 9 degrees change in the horizon.

In some embodiments, the combination of target size and template size are chosen to simulate areas of interest during laparoscopic surgical procedures.

In a method according the invention, a system as described above and depicted in the drawing figures is provided for the use of the trainee. In a preferred embodiment, the laparoscopic camera skills of the trainee are assessed before training begins. The trainee is then allowed to use the laparoscopic camera to acquire an image of a geometric target found on base 10. Each image is deemed acceptable when the image remains within the correct form as specified by template 40 for five seconds, following which the trainee acquires the next image on base 10. The trainee repeatedly practices navigation using base 10 until the trainee has mastered acquisition of the targets on base 10 within a predetermined time threshold determined as a function of the time required by an expert laparoscopic camera operator. The trainee then repeats the process used for base 10, except that the trainee uses a 30 degree angled laparoscope to acquire images of the targets on base 20. Finally, the trainee's laparoscope navigation skills are evaluated again and compared to the findings prior to training. The method may conform to the specifications in the example below, which describes a method that has proven effective using a controlled statistical study.

Example of Method and Proof of Transferability of Training to Operative Procedures For some embodiments of the invention, effectiveness of the system and method of the invention was verified as follows.

Study Design

Twenty second-year medical students with no prior laparoscopic camera navigation experience were enrolled in an IRB-approved protocol. The subjects completed a questionnaire in which demographic and background data was obtained. After an analysis of demographic data, no differences were found between the groups. An instructional video was viewed which explained the use of the angled laparoscope and showed the ideal views to achieve during the simulated laparoscopic Nissen fundoplication in a live porcine model.

Using a videotaped explanation of camera manipulation insured the uniformity of the information given and it also gave the advantage of showing the views desired in the porcine model. For the novice this was beneficial as the general views did not need to be explained during the procedure. This technique of being shown the desired views preoperatively may also be beneficial if utilized for camera operators in the setting of camera navigation in the human operating room.

Immediately after viewing the video, the subjects controlled the 30° laparoscope during the simulated Nissen. The same surgeon performed all procedures from the foot of the table with the camera navigator to the right of the animal. The monitor was set so the camera navigator, area of interest and monitor were aligned. Each of the required views was achieved.

Right crus
Left Crus
Retroesophagus from the right
Retroesophagus from the left
Instrument as it passes below the esophagus from right to left
Tip of instrument on the right
Stomach as it passes below the esophagus from left to right
Center instruments while one knot is tied
Follow the needle out Standardized verbal cues were given as needed and the number given was recorded. Performance was videotaped for later assessment. Subjects were stratified according to the total number of verbal cues given and randomized to control or training groups.

The ten subjects in the trained group trained under the direct supervision of a senior medical student who had achieved the expert levels. Expert levels on the 0° board were achieved on two consecutive attempts prior to proceeding to the 30° board. Training on the 30° board continued until the expert level was reached on two consecutive attempts. Training occurred over a two-week period and all achieved the expert levels as described. All subjects reviewed the instructional videotape and controlled the 30° laparoscope during a second simulated Nissen with the same surgeon performing the procedures. Verbal cues were recorded and performance was videotaped. Statistical analysis was performed using Fisher Exact Test, t-Test or Mann-Whitney Rank Sum based on the data analyzed (Sigma Stat).

Demographic data of the two groups showed no significant difference in handedness or gender using Fisher Exact Test. In addition, there was no difference between groups in laparoscopic experience, age, video game experience, or billiard experience. At pre-testing there was no significant differences detected in verbal cues given, percent of time in the optimal surgical view, errors committed or total time of the procedure.

The training group demonstrated significant improvement in verbal cues given, percent of time in the optimal surgical view, errors made, and total time while the control group only showed improvement in verbal cues given (table 1). When comparing groups at post testing, the training group demonstrated significantly better scores for verbal cues and percent of time in the optimal surgical view.

TABLE 1

| | CONTROL | | | TRAINED | | |
|---|---|---|---|---|---|---|
| | Pre test | Post test | P value | Pre Test | Post test | P value |
| Verbal cues | 16.5 | 8 | .012 | 17.1 | 2.1 | .001 |
| Percent optimal surgical view | 41.9 | 45.0 | .558 | 39.9 | 63.5 | <.001 |
| Errors/min | 4.8 | 4.6 | .832 | 4.8 | 3.7 | .027 |
| Total time in min | 8.83 | 7.7 | .23 | 9.5 | 6.33 | .001 |

Achievement of Expert Level Competency

Expert levels for the model were obtained by testing two advanced laparoscopists, defined as having performed greater than 250 laparoscopic cholycystectomies and greater than 100 advanced laparoscopic procedures. Each was required to acquire the targets, in order, and hold the position for five seconds prior to advancing. If an error occurred by drifting outside the lines of the template, the five seconds restarted once the target was reacquired. Ten repetitions on each board were performed and the trimmed mean (discarding any time greater or less than mean±2 standard deviations) for each expert was obtained. These means were averaged to obtain the expert level.

Pilot data using a camera navigation novice and a person with moderate camera navigation experience was obtained. The pilot data showed the level was not initially obtainable by the novice or the partially trained. However with training, both achieved the expert level.

The expert levels required no trimming as no times were outside of mean±2SD. Expert one had a mean score of 48±3.1 sec. for the 0° board and a mean score of 81.9±8.9 for the 30° board. Expert two had scores of 49.3±3.1 and 78.4±6.1 giving an overall expert score, rounded to the nearest second, of 49 sec. for the 0° board and 80 sec. for the 30° board.

Simulated Porcine Nissen Model and Scoring

To assess the effect of training and to minimize the utilization of animals, we elected to develop a simulated porcine Nissen model. The simulated model allows multiple assessments to be performed on one animal. One animal was anesthetized by standard protocol, a total of five ports were placed in a standardized fashion by one expert. Two working ports were placed to the right and left of a midline port for the camera. The additional ports were for the liver retractor and an assistant's instrument. Crural and retroesophageal dissection was undertaken. Camera views were chosen to closely simulate the typical Nissen fundoplication. The right and left crural views were held for ten seconds to simulate dissection. The retroeshophageal views simulate retroesophageal dissection. Division of the short gastric vessels was omitted as it is unnecessary in the porcine model and could only be performed once. Tracking of the instrument and stomach are identical to that performed in a routine Nissen as is the centering of the instruments while suturing. A gastrogastric suture was used to avoid repetitive suturing of the esophagus. Only one suture was used in the interest of time. Finally, the needle was followed out as is typical in a standard laparoscopic procedure. The ideal views were videotaped for later use.

Two scoring systems were developed. Pilot data from a subject trained to the expert levels and a novice camera operator were obtained. Videotapes were made of the subjects obtaining the ideal views as described. The tapes were scored for 1) percent optimal surgical view defined as maintaining the area of interest within the central 25% of the monitor, and 2) for the number of predefined errors (table 2) occurring in 15 sec intervals similar to that previously validated.(Seymour, 2002 71/id). Time to complete the procedure was also recorded. Verbal cues were needed to assist the novice in completing the task; however, these were not recorded in the pilot data.

TABLE 2

| | Errors per minute | |
|---|---|---|
| | Pre-test | Post Test |
| Control | 4.8 | 4.6 |
| Trained | 4.8 | 3.7 |
| P value‡ | .877 | .411 |

Errors recorded during the performance of procedure
Horizon
Sizing (too far/close)
Centering
Steadiness

TABLE 3

| | Number of Verbal Cues Required to Achieve Optimal Surgical View | |
|---|---|---|
| | Pre-test | Post Test |
| Control | 16.5 | 8 |
| Trained | 17.1 | 2.1 |
| P value‡ | .897 | .023 |

Verbal cues provided to trainees
Move in/closer
Move out
Move light cord for a better angle
Adjust horizon
Center the picture The simulated porcine Nissen model was felt to be an adequate representation of the standard procedure. Pilot data on the scoring system revealed the trained subject having a better percent optimal surgical view (63.5% vs. 45%), fewer errors per minute (3.7 vs. 4.6) and decreased operative time (380 seconds vs. 462 seconds). Anecdotally, the number of verbal cues was less for the trained subject as well therefore standardized cues were incorporated as another scoring system.

TABLE 4

Operative Time in Seconds

|  | Pre-test | Post Test | P value+ |
|---|---|---|---|
| Control | 533 | 462 | .23 |
| Trained | 543 | 380 | .001 |
| P value‡ | .886 | .162 |  |

REFERENCES

Laparoscopic splenectomy.
Glasgow R E; Mulvihill S J
World journal of surgery, April 1999, 23(4):384-8
Laparoscopic floppy Nissen fundoplication.
Richardson W S; Hunter J G
American journal of surgery, February 1999, 177(2):155-7
Laparoscopic gastric resection.
Cuschieri A
The Surgical clinics of North America, August 2000, 80(4): 1269-84, viii
Laparoscopic Roux-en-Y gastric bypass for morbid obesity.
Nguyen N T; Ho H S; Mayer K L; Palmer L; Wolfe B M
Journal of the Society of Laparoendoscopic Surgeons/Society of Laparoendoscopic Surgeons,
July-September 1999, 3(3):193-6
Laparoscopic-assisted Roux-en-Y gastric bypass.
Schweitzer M A; Broderick T J; Demaria E J; Sugerman H J
Journal of laparoendoscopic & advanced surgical techniques. Part A, October 1999, 9(5):449-53
Laparoscopic adrenalectomy: new gold standard.
AU: Author
Smith C D; Weber C J; Amerson J R
World journal of surgery, April 1999, 23(4):389-96
Comment in: World J Surg. December 1999; 23(12):1318-9 [AN=10610607]
Evolving techniques in endoscopic extraperitoneal hemiorrhaphy.
Ferzli G; Kiel T
Surgical endoscopy, August 1995, 9(8):928-30
Comparison of laparoscopic colectomy with and without the aid of a robotic camera holder.
Merola S; Weber P; Wasielewski A; Ballantyne G H
Surgical laparoscopy, endoscopy & percutaneous techniques, February 2002, 12(1):46-51
Self-guided robotic camera control for laparoscopic surgery compared with human camera control.
Omote K; Feussner H; Ungeheuer A; Arbter K; Wei G Q; Siewert J R; Hirzinger G
American journal of surgery, April 1999, 177(4):321-4
Surgeon workload and motion efficiency with robot and human laparoscopic camera control.
Kondraske G V; Hamilton E C; Scott D J; Fischer C A; Tesfay S T; Taneja R; Brown R J; Jones D B
Surgical endoscopy, November 2002, 16(11):1523-7
Determination of the learning curve of the AESOP robot.
Jacobs L K; Shayani V; Sackier J M
Surgical endoscopy, 1997 January, 11(1):54-5
The transfer of basic skills learned in a laparoscopic simulator to the operating room.
Hyltander A; Liljegren E; Rhodin P H; Lonroth H
Surgical endoscopy, September 2002, 16(9):1324-8
A virtual reality surgical trainer for navigation in laparoscopic surgery.
Haluck R S; Webster R W; Snyder A J; Melkonian M G; Mohler B J; Dise M L; Lefever A
Studies in health technology and informatics, 2001, 81:171-6
An ergonomic analysis of the "fulcrum effect" in endoscopic skill acquisition.
Gallagher A G, McClure N, McGuigan
J. Endoscopy 1998; 30:617-620.
Virtual reality training leads to faster adaptation to the novel psycomotor restrictions encountered by laparoscopic surgeons.
Jordan D B
Surg Endosc 2001; 15:1080-1084.
The influence of three-dimensional video systems on laparoscopic task performance.
Jones D B, Brewer J D, Soper N J.
Surg Laparosc Endosc 1996; 6:191-197.

Therefore we claim:

1. A system for training a person in the use of a laparoscopic instrument having a laparoscopic camera and a monitor for displaying images captured by the laparoscopic camera, the system comprising:
 a base;
 a plurality of targets disposed in spaced relation on the base for viewing by the laparoscopic camera;
 each of the targets bearing a geometric shape;
 a template mountable to or displayable by the monitor, the template bearing a first orientation line;
 the targets and the template configured such that acquiring a laparoscopic image of each target disposed upon the base requires a change in location and angular orientation of the laparoscopic camera.

2. The system according to claim 1, wherein the geometric shape of each of the targets is the same.

3. The system according to claim 2, wherein the geometric shape comprises second orientation line.

4. The system according to claim 2, wherein each geometric shape comprises a circle.

5. The system according to claim 4, wherein the second orientation line lies approximately parallel to the base at approximately the mid-height of the circle.

6. The system according to claim 1, wherein the template compares the acquired laparoscopic image of one of the plurality of targets to a desired laparoscopic image.

7. The system according to claim 6, wherein the template is configured for comparing the shape of the acquired laparoscopic image of one of the plurality of targets to the shape of the desired laparoscopic image.

8. The system according to claim 7, wherein the template is further configured for comparing the angular orientation of the laparoscopic image of one of the plurality of targets to the angular orientation of the desired laparoscopic image.

9. The system according to claim 8, wherein the template is further configured for comparing the size of the acquired laparoscopic image of one of the plurality of targets to the size of the desired laparoscopic image.

10. The system according to claim 9, wherein the template comprises a first geometric shape and a second geometric shape lying within the first geometric shape, and wherein the desired laparoscopic image has a perimeter between the first geometric shape and the second geometric shape.

11. The system according to claim 10, wherein each target has disposed thereon an image of a circle, and wherein on the template the first geometric shape is a circle and the second geometric shape is a circle essentially concentric with the first geometric shape.

12. The system according to claim 11, wherein the template is disposed on a transparent sheet.

13. The system according to claim 6, wherein the template is disposed on a transparent sheet.

14. The system according to claim 1, further comprising a a training box having a simulated port for the laparoscopic camera.

15. A method for training a person in the use of laparoscopic instruments, comprising:
   providing the person with a first laparoscopic camera, a simulated port for the laparoscopic camera, a first plurality of targets disposed in spaced relation on a base for viewing by the first laparoscopic camera, each of the targets bearing a geometric shape, and a template mountable to or displayable by a monitor, the template bearing a first orientation line; and
   having the person change location and angular orientation of the first laparoscopic camera to acquire in sequence first image of each of the first plurality of targets thereby causing the first image of each target to fit a template.

16. The method of claim 15, further comprising repeating the having the person change location and angular orientation of the first laparoscopic camera until the first images are appropriately acquired in less than a first threshold time.

17. A method for training a person in the use of laparoscopic instruments, comprising:
   providing the person with a first laparoscopic camera, a simulated port for the laparoscopic camera, and a first plurality of targets configured for viewing by the first laparoscopic camera;
   having the person use the first laparoscopic camera to acquire in sequence a first image of each of the first plurality of targets so that the acquired first images fit a template;
   repeating the having the person use the first laparoscopic camera until the first images are appropriately acquired in less than a first threshold time;
   providing the person with a second laparoscopic camera and a second plurality of geometric targets configured for viewing by the second laparoscopic camera; and
   after the first images are acquired in less than the first threshold time, having the person use the second laparoscopic camera to acquire in sequence an image of each of the second plurality of geometric targets so that the acquired second images fit the template,
   wherein the first laparoscopic camera is a 0-degree laparoscopic camera and the second laparoscopic camera is an angled laparoscopic camera.

* * * * *

UNITED STATES PATENT AND TRADEMARK OFFICE
CERTIFICATE OF CORRECTION

| | | |
|---|---|---|
| PATENT NO. | : 7,802,990 B2 | Page 1 of 1 |
| APPLICATION NO. | : 11/042803 | |
| DATED | : September 28, 2010 | |
| INVENTOR(S) | : James R. Korndorffer et al. | |

It is certified that error appears in the above-identified patent and that said Letters Patent is hereby corrected as shown below:

On the Title Page

(57) Abstract, line 11          After "images" Insert -- of --

In the Claims

Column 10, Claim 3, line 44      After "comprises" Insert -- a --

Column 11, Claim 15, line 26    Before "first" Insert -- a --

Signed and Sealed this
Fourth Day of October, 2011

David J. Kappos
*Director of the United States Patent and Trademark Office*